INVENTOR.
WARREN D. NOVAK
RAYMOND L. GARMAN

Aug. 28, 1962 W. D. NOVAK ETAL 3,051,775
SUBSCRIPTION TELEVISION USE RECORDING SYSTEM
Filed Nov. 13, 1959 7 Sheets-Sheet 6

INVENTOR.
WARREN D. NOVAK
RAYMOND L. GARMAN
BY
ATTORNEY

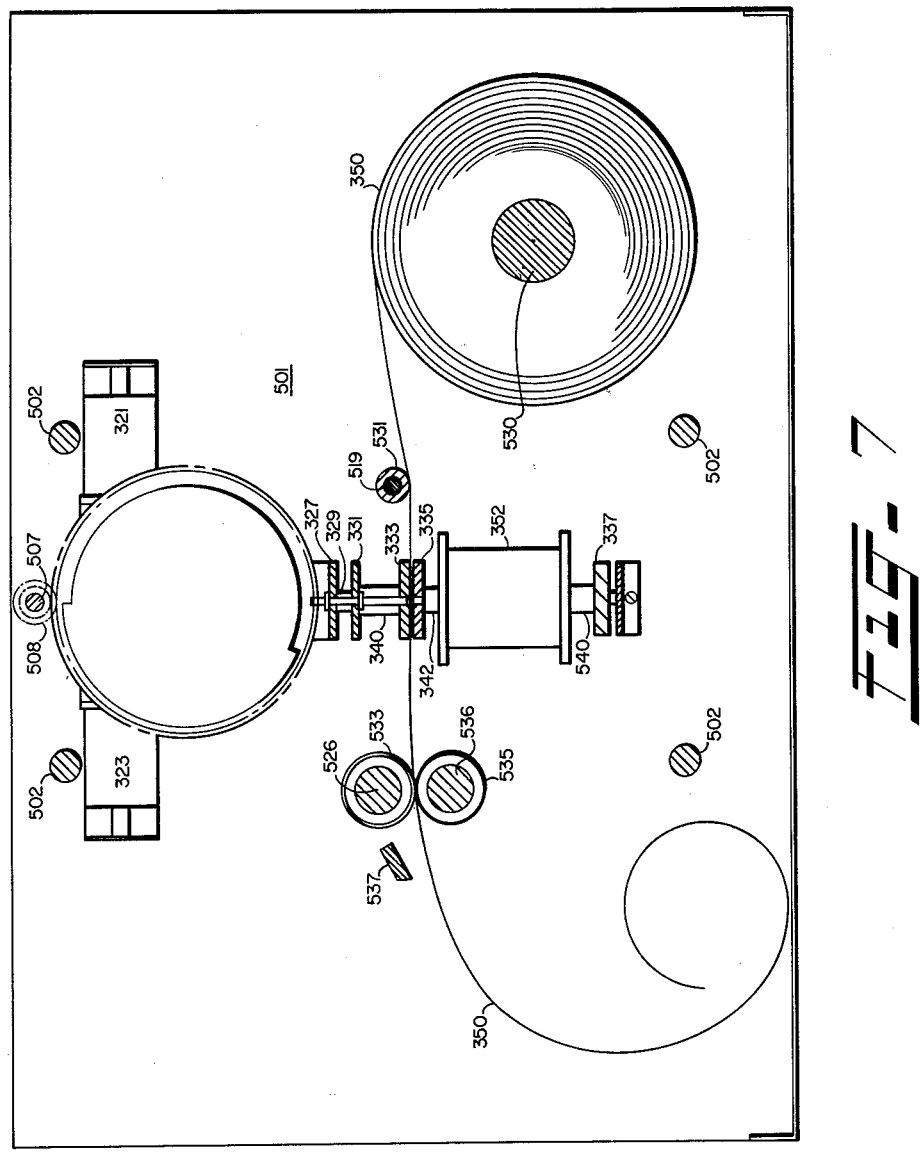

United States Patent Office 3,051,775
Patented Aug. 28, 1962

3,051,775
SUBSCRIPTION TELEVISION USE RECORDING SYSTEM
Warren D. Novak, Chappaqua, and Raymond L. Garman, Hastings on Hudson, N.Y., assignors to General Precision, Inc., a corporation of Delaware
Filed Nov. 13, 1959, Ser. No. 852,826
1 Claim. (Cl. 178—5.1)

This invention relates to recording systems and more particularly to automatic recording systems which provide a permanent time record of the occurrence of an event or condition. The invention will be described in connection with a subscription television system for which it is particularly suited.

It has become increasingly apparent that one form or another of subscription or toll television is necessary to satisfy the needs of an existing market. An experiment was recently conducted in a city of moderate size to determine the feasibility of toll television. The experiment got off to a good start and appeared to be a success, but after a while a large number of subscribers dropped out and as time went on more subscribers dropped out than joined. When this trend continued the experiment was dropped and an attempt made to analyze the operation to determine the reasons for its failure.

The most important reason for the failure was the method used in charging for the service. Each subscriber was charged a flat rate without regard for the actual amount of usage and those subscribers who did not take full advantage of the service felt the charges was not warranted and therefore discontinued the service.

As a result of the study, a list of requirements for a successful system evolved. These requirements are:

(1) A subscriber should have a choice of more than one program at any given time, preferably three or more;
(2) Charges should be based on the quality of the program being viewed and the actual amount of time the program is viewed;
(3) The system should be foolproof to the extent that no charges will be made if the subscriber is unable to receive a program due to a power failure in his home notwithstanding the fact that a selection has been made;
(4) The equipment necessary to implement the system must be low in cost (less than $50.00); have a long life expectancy; and require little or no servicing after installation;
(5) The system must maintain time synchronization with the transmitting station at all times and under all conditions in order that an accurate record of the actual time the service is used can be made for billing purposes;
(6) The system should provide a permanent record of the programs viewed and the actual period of time the program was viewed. Furthermore, the record should be in a form suitable for automatic machine billing; and
(7) The subscriber should be able to change from subscription television to normal television viewing or vice versa at any time without being required to do more than press a button or flip a switch.

Existing devices were examined with the hope that they might solve the problems blocking a successful distribution system. Of the devices available, an automatic coin box, similar to those used in hotels for metering the use of radio and television receivers, was considered the most likely to solve the problem. However, after careful consideration it was determined that automatic coin boxes presented a number of insurmountable obstacles. The coin boxes, while reliable, cost far in excess of the fifty dollar limit necessary to have a successful system. Automatic coin boxes are also unsound from the psychological point of view, since they require a subscriber to have sufficient change of the correct denomination on hand to operate the device for at least one evening. Furthermore, the presence of a coin box in one's living room is not considered in good taste by many people. Furthermore, coin boxes require a company representative to enter a subscriber's home periodically to collect the money deposited by the subscriber. Therefore, sufficient resistance to such a device could be expected so as to jeopardize any system based on its use.

One object of this invention is to provide a system for selectively connecting one of a plurality of information bearing channels to a utilizing device and for providing a permanent record of the channels connected and the times during which each was connected.

Another object of the invention is to provide a novel clock mechanism which is not subject to power failures and will maintain synchronism with a remote central time system.

Another object of the invention is to provide an automatic recording device for use in a multiple channel subscription television system which provides an accurate permanent chronological record of the channels viewed and the times during which they were viewed.

Yet another object of the invention is to provide an automatic recording system for use in a multiple channel subscription television system which is accurate, inexpensive to manufacture and not affected by power failures in the subscriber's home.

A further object of the invention is to provide an automatic recording system, including a clock mechanism, for use in a multiple channel subscription television system which will maintain synchronism with a remote central time system at all times.

The invention contemplates a time base recording system comprising, means for selectively connecting one of a plurality of information bearing channels to a utilizing device and for providing output signals indicating which of the channels has been selected, recording means including a clock having a movable means with a partially relieved surface predetermined portions of which represent in coded form sequential elements of time, self contained power means connected to the movable means for supplying incremental motive power thereto in response to discrete signals from a source external to the clock; means including a plurality of movable members responsive to the channel indicating outputs from the selecting means for positioning selected members; and means juxtaposed with respect to said movable surface and said movable members and coacting therewith to provide a permanent record of the channel selected and the element of time encoded on the movable surface which corresponds positionally to the juxtaposed means.

The foregoing and other objects and advantages of the invention will appear more clearly from a consideration of the specification and drawings wherein one embodiment of the invention has been described and shown in detail for illustration purposes only.

In the drawings:

FIGURE 7 is a cross sectional view of the recording device taken along the line 7—7 of FIG. 5.

Figure 1:
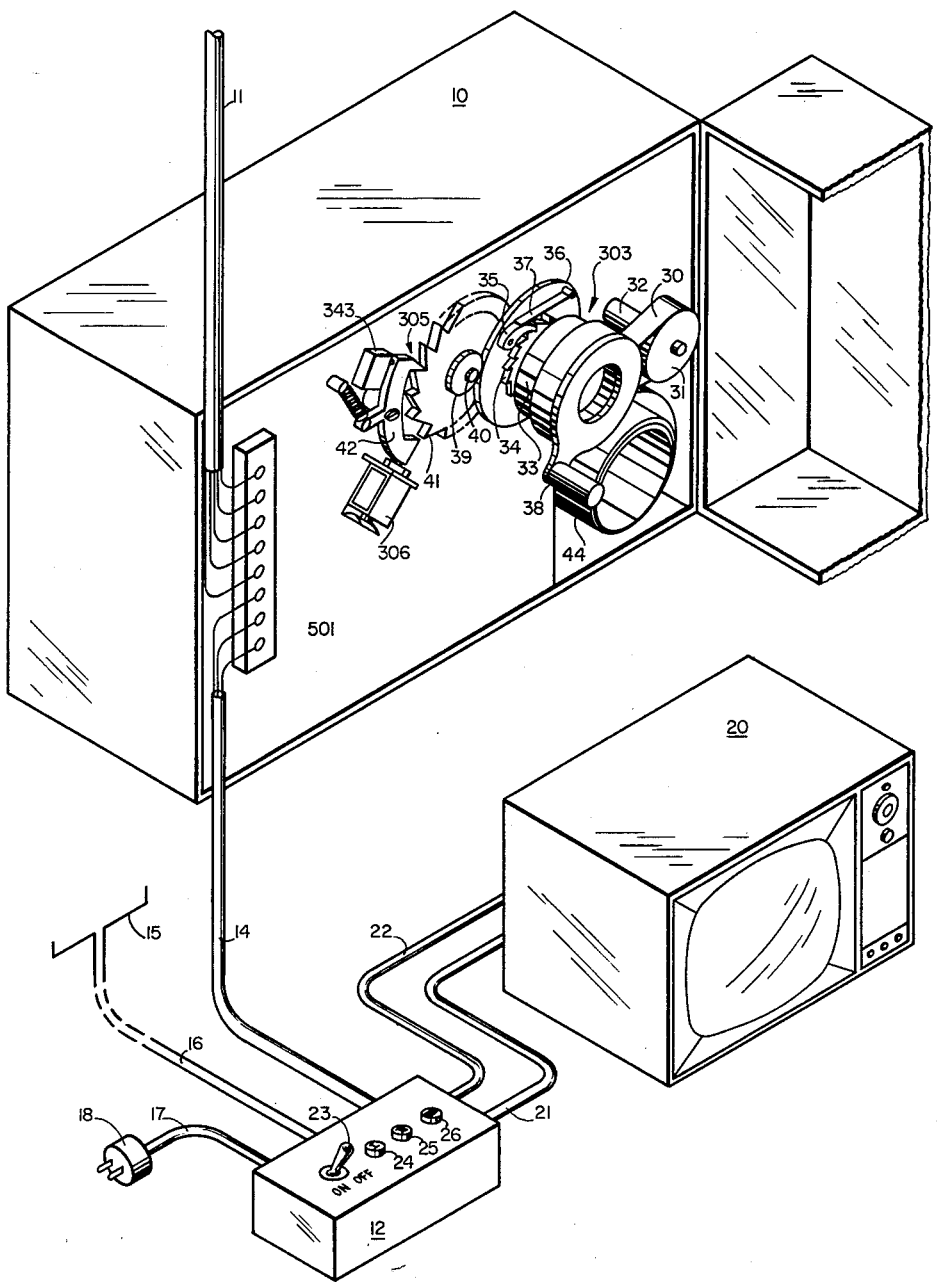
FIGURE 1 is an isometric drawing of the components installed in the home of a subscriber to a pay television system and their interconnections.

In FIG. 1, a recording device generally indicated by the numeral 10 is connected to a subscription center, not shown, by a cable 11. The subscription center supplies three video signals each with its associated carrier, three conversion signals and an R-F clock signal. These signals are supplied to a distribution amplifier, not shown, which may be of conventional design. The distribution amplifier and its associated circuits in addition to amplifying the video and conversion signals converts the R-F clock signal to a high level direct current pulse. The video signals, the conversion signals and the direct current clock pulse are transmitted over cable 11 to recording device 10.

A program selector unit 12 is connected to recorder 10 by a cable 14, to the house antenna 15 by a twin lead 16, and to a 120 volt 60 cycle supply by line cord 17 which terminates in a plug 18 suitable for insertion into the ordinary electrical receptacle found in most houses. A television receiver 20, of conventional design, has its power cord 21 connected to selector 12 and its antenna input, not shown, connected to selector 12 by a twin lead 22. Selector 12 has a two position toggle switch 23 and three push buttons 24, 25 and 26 mounted on its upper surface.

A description of the operation of the device from the point of view of the subscriber is helpful in arriving at an understanding of the operation of the system. If the subscriber wishes to look at broadcast television programs he merely puts toggle switch 23 in the "off" position and operates his television receiver in the normal manner. If he should desire to change from normal broadcast television to pay television, all he must do is flip toggle switch 23 to the "on" position, select the program he desires by depressing one of the three push buttons on selector 12 and tune his television receiver to a predetermined vacant broadcast channel. Thereafter he may view the program and if at any time he should change his mind he could change to another pay television program by merely pushing one of the other push buttons on selector 12. If he should desire to look at normal broadcast television he would only have to flip toggle switch 23 to the "off" position and tune his television receiver to the channel he desires.

While the subscriber is looking at pay television the recorder 10 provides a permanent record of the program he is viewing and the time periods during which he is viewing pay television programs. The recording unit may be located outside his home so that the record may be removed monthly and the unit serviced. The selector unit may be located on a wall near the television receiver or on the receiver itself.

Figure 2:
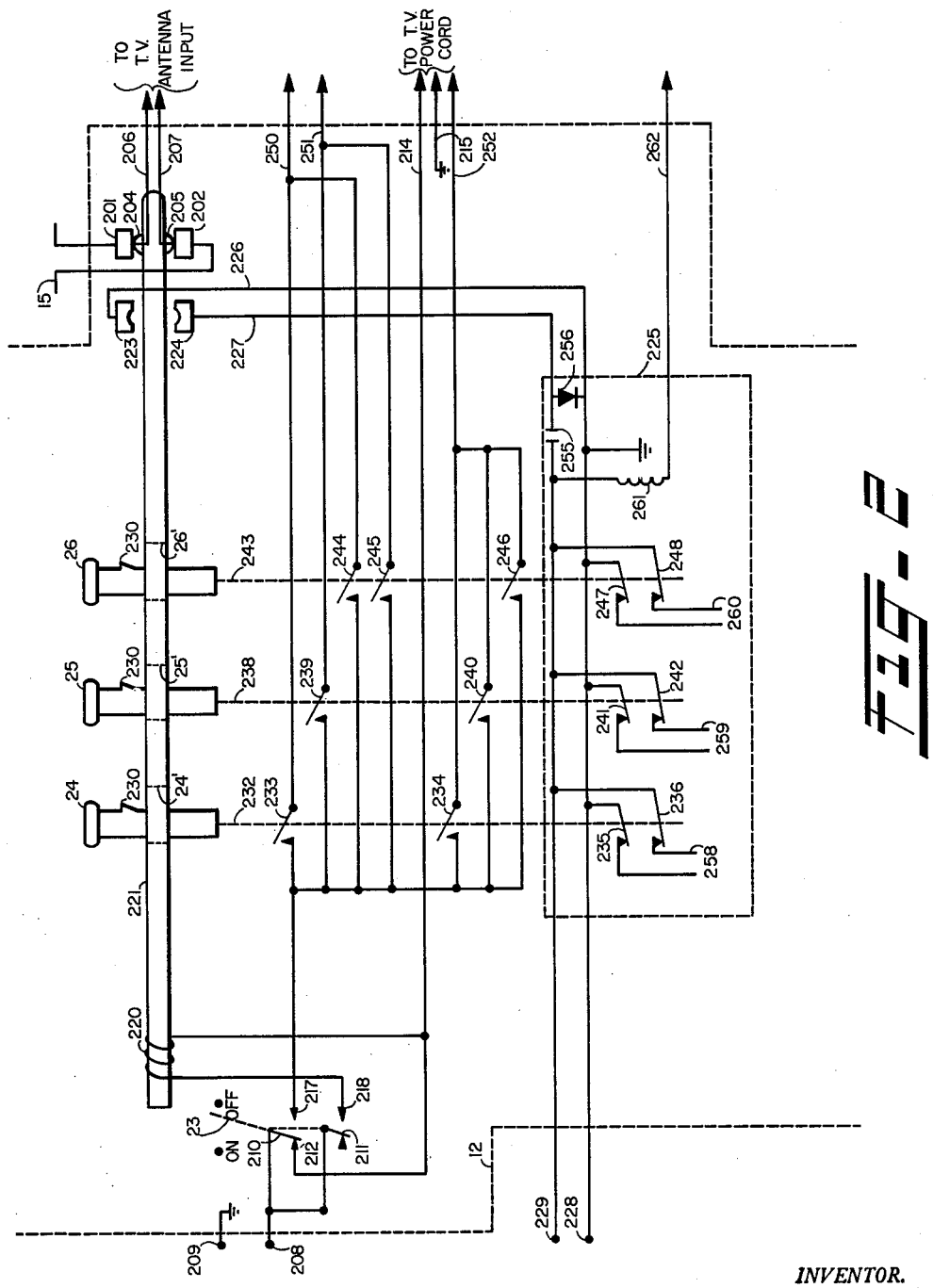
FIGURE 2 is a schematic diagram of the selector shown in FIG. 1.
Figure 4:
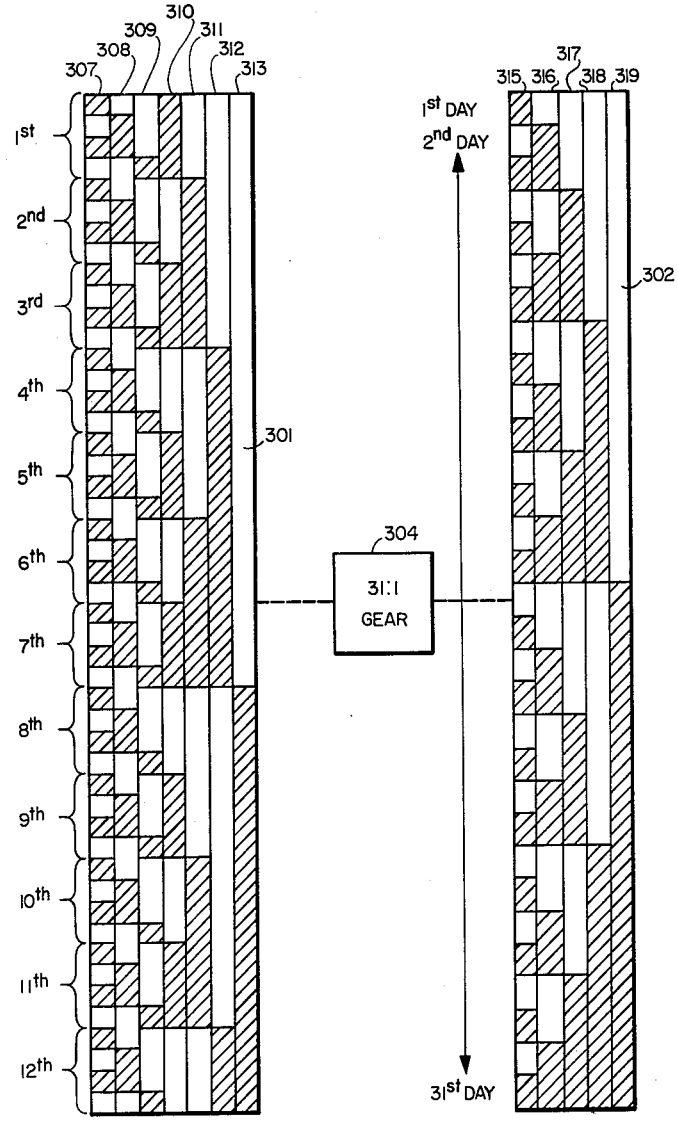
FIGURE 4 is a developed view of the relieved surface of the clock member shown in FIGS. 5 and 6.

Referring now to the schematic diagrams of FIGS. 2 and 4, which together provide an integrated picture of the operation of selector 12 and recorder 10, respectively. Selector 12 is shown in FIG. 2 in the normal television viewing condition with antenna 15 connected by fixed contacts 201 and 202, and movable contacts 204 and 205 to the antenna leads 22, which are connected to the antenna input of the television set 20 shown in FIG. 1.

Terminal 208 and grounded terminal 209 are connected to the house current and terminal 208 is connected to armatures 210 and 211 of a double pole double throw switch 23 which is shown in the "off" position. When switch 23 is in the "off" position armature 210 engages a fixed contact 212 to provide 120 volt house current on conductors 214 and 215 which are connected to the power cord of the television receiver. Thus, with switch 23 in the "off" position the television receiver is connected to the house current and the house antenna for normal broadcast television viewing.

When switch 23 is moved to the "on" position, armature 210 engages a fixed contact 217 of switch 23 and armature 211 engages a fixed contact 218. Conductor 214 is then connected to terminal 208 by a winding 220 which will, if the television receiver is turned on, displace a latching bar 221 to an alternate position to the left of the position shown. When the latching bar 221 is pulled to its alternate position by the current through winding 220, movable contacts 204 and 205 mounted on latching bar 221 are disconnected from fixed contacts 201 and 202 thus disconnecting the receiver from the house antenna. At the end of their travel movable contacts 204 and 205 engage another pair of fixed contacts 223 and 224, respectively, through which the pay television program signal is applied to the receiver input. Contacts 223 and 224 are connected to the output of a filter network 225, the operation of which will be described in detail later, by conductors 226 and 227, respectively, and the input of filter 225 is connected to the pay television program signal source through terminals 228 and 229.

Push buttons 24, 25 and 26 pass through openings 24', 25' and 26', respectively, in the latching bar 221. The push buttons are biased upwardly, by means not shown, and each button has a laterally extending protrusion 230 which engages the underside of latching bar 221 when the button is depressed to prevent the return of that button. A button which has been depressed, so that its protrusion prevents the return of the button, will be released whenever another button is depressed since the protrusion of the other button displaces latching bar 221 a sufficient distance to the right to free the protrusion of the first button from the restriction placed on its movement by the underside of the latching bar.

Push button 24 is connected by a linkage 232 to normally open switch armatures 233 and 234, and to normally closed switch armatures 235 and 236. Push button 25 is connected by a linkage 238 to normally open switch armatures 239 and 240, and to normally closed armatures 241 and 242. Push button 26 is connected by a linkage 243 to normally open switch armatures 244, 245 and 246, and to normally closed armatures 247 and 248.

Contact 217 of switch 23 is connected to the fixed contacts associated with switch armatures 233, 234, 239, 240, 244, 245 and 246. Switch armatures 233 and 244 are connected to a conductor 250; switch armatures 239 and 245 are connected to a conductor 251; and switch armatures 234, 240 and 246 are connected to a conductor 252. Thus, when switch 23 is in the "on" position and push button 24 is depressed to close switch armatures 233 and 234 alternating house current is provided on conductors 250 and 252. When push button 25 is depressed alternating house current is provided on conductors 251 and 252 through switch armatures 239 and 240; and, when push button 26 is depressed alternating house current is provided on conductors 250, 251 and 252 via switch armatures 244, 245 and 246.

As was pointed out previously, the signal supplied by the subscription center comprises the three video signals and their associated carriers, three conversion signals and an R-F clock signal at predetermined time intervals. Distribution amplifiers and their associated circuits which service local subscriber installations amplify the signals and convert the R-F clock signals to direct current pulses. The carrier frequencies and the conversion signal frequencies are so chosen that the sum or the difference, whichever is convenient for a given installation, of the first carrier and the first conversion signal frequencies equals the sum or difference depending on the choice made, of the second carrier and the second conversion frequencies, and the sum or difference of the third carrier and the third conversion frequencies. Thus, by choosing a sum or difference frequency which corresponds to the frequency of one of the vacant normal television channels available, preferably channels 5 or 6, any of the three programs may be viewed without changing the receiver channel selector once it is set at the proper channel.

Filter network 225 is so designed that all of the conversion frequencies are short circuited when push buttons 24, 25 and 26 are in the up position, but when one is in the down position the conversion frequency corresponding therewith is passed and mixes with the proper carrier and is detected in the receiver 20. The signals applied at terminals 228 and 229 are passed through a coupling condenser 255 to fixed contacts 223 and 224. A mixing diode 256 is connected across the signal carrying lines and provides sum and difference frequencies to the fixed contacts 223 and 224. Three open ended ¼ wavelength stubs 258, 259 and 260 are connected across the signal transmission lines by normally closed switch armature pairs (235, 236); (241, 242); and (247, 248); respectively. The stubs are cut so that each stub will short circuit a different one of the conversion signals. Thus, when none of the buttons are depressed all of the conversion signals are shorted and no signal appears at the receiver input which will be detected by the receiver. When a push button is depressed, however, one pair of switch armatures will be opened and the conversion frequency associated therewith will no longer be short circuited but will be mixed in diode 256 with the carriers and a signal containing one of the programs, suitable for detection in the receiver, will be applied through fixed contacts 223 and 224 to the receiver input.

One side of an R-F choke coil 261 is connected to one of the signal lines before the coupling condenser 255 and the other signal line is grounded. Coil 261 passes the direct current pulse from the distribution amplifier to conductor 262 which is connected to the other side of R-F choke coil 261.

Figure 3:
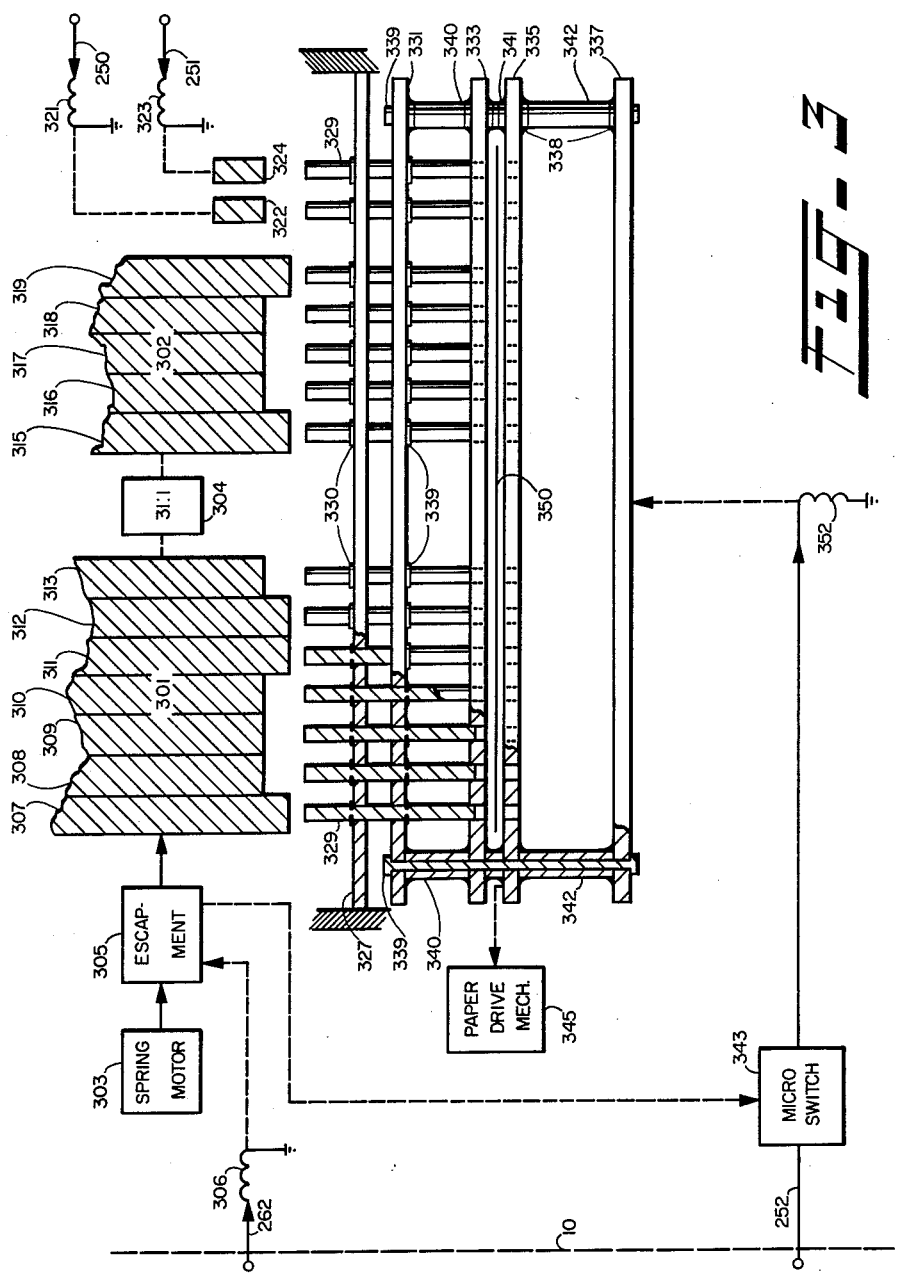
FIGURE 3 is a schematic diagram of the recording device shown in FIGS. 1 and 5.

Recorder 10 shown schematically in FIG. 3 provides a permanent record which contains in coded form information relative to the use of the service by a subscriber. Under normal operating conditions a serviceman will remove the record once a month for billing purposes. The record indicates chronologically which programs were viewed and the day and hours during which the subscriber viewed the various programs. The record is made by placing coded punched holes in a paper tape whenever a subscriber is using the service.

Recorder 10 has a clock mechanism which operates independently of the house current and is kept in synchronization by the clock pulses from the broadcasting station. The clock is arranged to operate at fifteen minute intervals of a twelve hour day and provides the fifteen minute reading over a thirty-one day month. When a month has less than thirty-one days the clock is reset by the broadcasting station by the insertion of a sufficient number of pulses during a non-broadcasting period to bring it to the correct hour and day for the next monthly period.

In the embodiment chosen for illustration, the quarter hours, hours, and days are engraved, moulded or cast on drum-like members in the form of a binary digital code. A plurality of discs are joined together to form a pair of drums 301 and 302. Drum 301 has seven discs and drum 302 has five discs. The drums are driven by a spring motor 303 which is operated through an escapement 305. Escapement 305 is operated by a solenoid 306 which is connected between conductor 262 and ground. Solenoid 306 operates the escapement and permits one tooth to escape each time a direct current pulse appears on conductor 262. Drum 301 is directly driven by the escapement but drum 302 is driven through 31:1 reduction gear 304 and thus rotates through one complete revolution for every thirty-one revolutions of drum 301.

All of the discs comprising drums 301 and 302 have the same diameter and rotate about their centers. Disc 307 of drum 301 has its peripheral surface divided into 48 equal portions. Alternate portions of the surface are relieved. Disc 308 has its peripheral surface divided into 24 equal portions and alternate portions are relieved. Disc 309 has its peripheral surface divided into twelve equal portions, with the last fourth of each portion being relieved. Disc 310 has its peripheral surface divided into twelve equal portions, with alternate portions being relieved. Disc 311 has its peripheral surface divided into six equal portions, with alternate portions being relieved. Disc 312 is divided into four portions, with alternate portions being relieved. A first relieved portion extends ¼ the peripheral distance and the second extends ⅓. A first unrelieved portion extends ⅓ the peripheral distance and the second $\frac{1}{12}$. Disc 313 is divided into two portions. One relieved portion extends $\frac{7}{12}$ of the peripheral distance and a second unrelieved portion extending the remainder of the peripheral distance.

Discs 307, 308 and 309 provide the quarter-hour information and discs 310, 311, 312 and 313 provide the hour information. In FIG. 4, which is a developed view of the surface of drums 301 and 302, the arrangement of the discs comprising the drums is shown. The shaded portions are the unrelieved portions and the unshaded portions the relieved portions of the surface. The twelve broadcast hours of the day are marked off by brackets at the left side of drum 301. Each bracket includes the first, second, third and fourth quarter-hour of one of the twelve broadcast hours and the code is repeated for each of the twelve hours. Disc 315 of drum 302 has its peripheral surface divided into 31 equal portions. The first portion is unrelieved and the second relieved. The remaining portions repeat this pattern with the 31st portion being unrelieved and adjacent the unrelieved first portion. Disc 316 is divided into sixteen portions, with alternate portions being relieved. The first relieved portion extends $\frac{1}{31}$ of the peripheral distance and each of the remaining portions $\frac{2}{31}$ of the peripheral distance. Disc 317 is divided into eight portions, with alternate portions being relieved. The first relieved portion extends for $\frac{3}{31}$ of the peripheral distance and each of the remaining portions for $\frac{4}{31}$ of the peripheral distance. Disc 318 is divided into four portions, with alternate portions being relieved. The first relieved portion extends for $\frac{7}{31}$ of the peripheral distance and each of the remaining portions for $\frac{8}{31}$ of the peripheral distance. Disc 319 is divided into two portions. One relieved portion extends $\frac{15}{31}$ of the peripheral distance and one unrelieved portion extends $\frac{16}{31}$ of the peripheral distance.

Referring again to FIG. 4, the relative positions of discs 315, 316, 317, 318 and 319 are shown by the developed view of the peripheral surface of drum 302. Drum 302 is used solely to indicate days and is driven through gearing 304 so that it goes through one complete revolution for every thirty-one complete revolutions of drum 301 or $\frac{1}{31}$ of a revolution for each complete revolution of drum 301 which revolves $\frac{1}{48}$ of a revolution each time solenoid 306 operates escapement 305.

Conductor 250 of FIG. 2 is connected to a grounded solenoid 321, FIG. 3, which operates an obstructing member 322 and conductor 251 is connected to a grounded solenoid 323 which operates an obstructing member 324. Members 322 and 324 are shown in their non-obstructing position. When solenoid 321 is energized, member 322 moves to its obstructing position to indicate that program one is being viewed and remains in this position as long as program one is being viewed. When program two is being viewed, solenoid 321 is deenergized and member 322 returns to its non-obstructing position; solenoid 323 is energized and member 324 moves to its obstructing position to indicate that program two is being viewed and remains in this position as long as program two is being viewed. When program three is being viewed, solenoids 321 and 323 are both energized moving members 322 and 324 to their obstructing positions to indicate that program three is being viewed and both remain in their obstructing positions as long as program three is being viewed. When normal television programming is being viewed, neither solenoid is energized and members 322 and 324 both occupy their non-obstructing positions.

A fixed mounting bar 327 is located below and parallel with the axis of drums 301 and 302 and provides a support for a plurality of identical punches 329. Punches 329 are distributed in a line along bar 327 with a single punch being located directly under each of the discs in drums 301 and 302 and single punches located directly under the obstructing positions of members 322 and 324.

Each punch has a snap ring 330 mating with a circumferential groove on the punch which limits the downward movement of the punch when the ring 330 engages the upper surface of bar 327.

The punches pass through openings in a return plate 331 and a stripper plate 333. A die plate 335 having holes therethrough is positioned below stripper plate 333 so that each punch will enter a different hole in the die plate when the die plate is urged upward. Return plate 331, stripper plate 333, die plate 335, and an actuator bar 337 are held together as a rigid unitary structure by tubular separators 340, 341 and 342 which are fastened to the plates by welding, brazing or soldering shown at 338.

Each of the punches has a second snap ring 339 mating with a second circumferential groove on the punch. Snap rings 339 bear against the underside of plate 331 and the punches are retracted to their lower position by plate 331 when it engages the rings 339 after a punching operation. The punched record is made on a paper tape 350 which passes between stripper plate 333 and die plate 335. The tape 350 will be perforated only by those punches which are obstructed in their upward movement by an unrelieved portion of the disc and by the punches which are obstructed by members 322 and 324 when they are in their obstructing positions. Those punches which are not obstructed will be moved upward by the tape and then returned on the down stroke of the punching mechanism.

The punching mechanism is operated only when the television receiver is turned on, a pay television program has been properly selected and a clock pulse is received from the pay television broadcasting station.

Conductor 252 from selector 12 supplies house current to a grounded solenoid 352 via a normally open microswitch 343 whenever the pay television selector and the receiver are both turned on and a program has been selected by pressing one of the three program selection buttons. Microswitch 343 is mechanically coupled to escapement 305 and is closed each time solenoid 306 operates the escapement. Thus, the conditions set forth above are satisfied and the tape is punched only when both the receiver and selector are turned on, a pay television program has been selected by depressing one of the program selector buttons, and a clock pulse is received from the pay television broadcasting station.

Once the tape has been punched, a paper drive mechanism 345 is actuated by the latter portion of the return stroke of the punching mechanism to advance the tape in preparation for the next punching operation. The latter portion of the return stroke is used to provide time for the stripper plate to disengage the tape from the punches so that the paper drive mechanism can move the tape without tearing it.

The structures shown schematically in FIGS. 3 and 4 and described above will be more fully described in connection with the descriptions of FIGS. 1, 5, 6 and 7 which follow. FIGS. 1, 5, 6 and 7 illustrate one specific arrangement of the parts which accomplish the results set forth above.

Referring again to FIG. 1, motor 303 comprises a flat spring 30 wound on a takeup pulley 31 which is free to rotate or a fixed stub shaft 32 mounted on an upright front wall 501 and on a drive pulley 33 which is free to rotate on a stub shaft not shown. Spring 30 is so wound that pulley 33 is caused to rotate in a counterclockwise direction while takeup pulley 31 rotates in a clockwise direction. The driving force applied to pulley 33 is transmitted through a ratchet wheel 34 and a mating pawl 35 to a gear 36. Pawl 35 is pivotally mounted on the side of gear 36 and is held in engagement with wheel 34 by a flat spring 37 which is attached to the side of gear 36 and urges the free end of the pawl toward the ratchet wheel. Thus, spring 30 may be wound onto drive pulley 33 by rotating a handle 38, attached thereto, in clockwise direction without causing any movement of gear 36 and the clock mechanism.

Gear 36 meshes with and drives a gear 39 which is keyed to a shaft 40 which drives drum 301. Escapement 305 controls the driving force so that shaft 40 turns only 1/48 of a revolution each time a clock pulse is received from the pay television broadcast station. The escapement comprises a ratchet wheel 41 having 48 teeth. Wheel 41 is keyed to shaft 40 and restricts the movement of shaft 40 to 1/48 revolution each time solenoid 306 moves the anchor mechanism 42. The movement of anchor mechanism 42 closes microswitch 343 which is in series with solenoid 352 and enables the punching mechanism as described earlier in connection with the description of FIG. 3. The punched tape record is stored in a compartment 44 at the lower right hand corner of recorder 10 and will be removed about once every 30 to 40 days by the serviceman who will at the same time wind spring motor 303.

Figure 5:
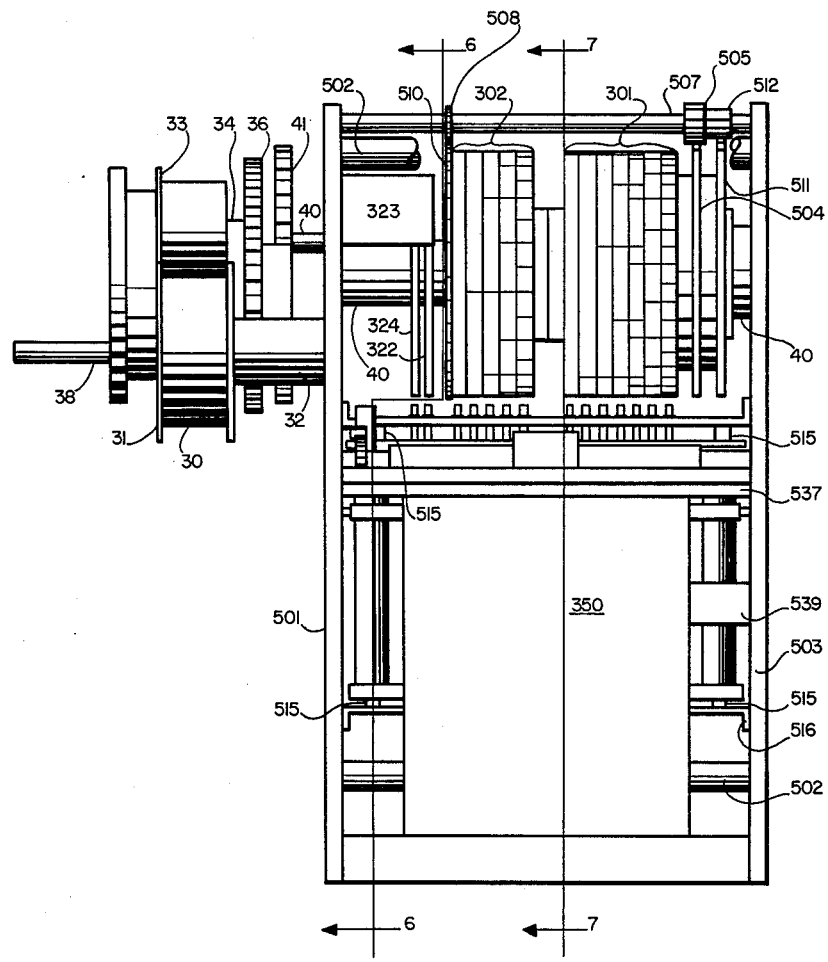
FIGURE 5 is an end view of the recording device shown in FIG. 1 with the cover removed.

In FIG. 5, shaft 40 extends through wall 501 and is journaled therein. It extends across the device and terminates at an upright rear wall 503 and is journaled therein. Plates 501 and 503 are rigidly joined together by rods 502 which extend between the plates to hold them in a fixed position relative to one another. Drum 301 is mounted on and drivingly connected to shaft 40 while drum 302 is mounted for rotation on the shaft. A gear 504 with two adjacent teeth only on its periphery is also keyed to shaft 40 and meshes with one tooth of a gear 505 for each complete revolution of shaft 40. Gear 505 is keyed to shaft 507 which is journaled in walls 501 and 503. A gear 508 is also keyed to shaft 507 and meshes with and turns a gear 510 which is drivingly connected to drum 302. The gear train comprising gears 504, 505, 508 and 510 provides a 31 to 1 gear reduction to rotate drum 302 through one complete revolution for each 31 revolutions of shaft 40.

In order to prevent rotation of drum 302 when gear 505 is disengaged from gear 504, a braking or locking mechanism is provided. A wheel 511 having a single detent on its periphery in line with the teeth on gear 504 is drivingly connected to shaft 40; another gear 512 having half the number of teeth as gear 505 is keyed to shaft 507 so that each time a tooth of gear 505 meshes with the teeth on gear 504 to rotate shaft 507 a tooth on gear 512 will enter the detent and permit a limited rotation of the shaft. Once the detent passes, further rotation of shaft 507 is prevented since adjacent teeth on gear 512 are in sliding contact with the periphery of wheel 511 which locks shaft 507 until the detent comes around once more to clear one tooth of gear 512 and permit another limited rotation.

Figure 6:
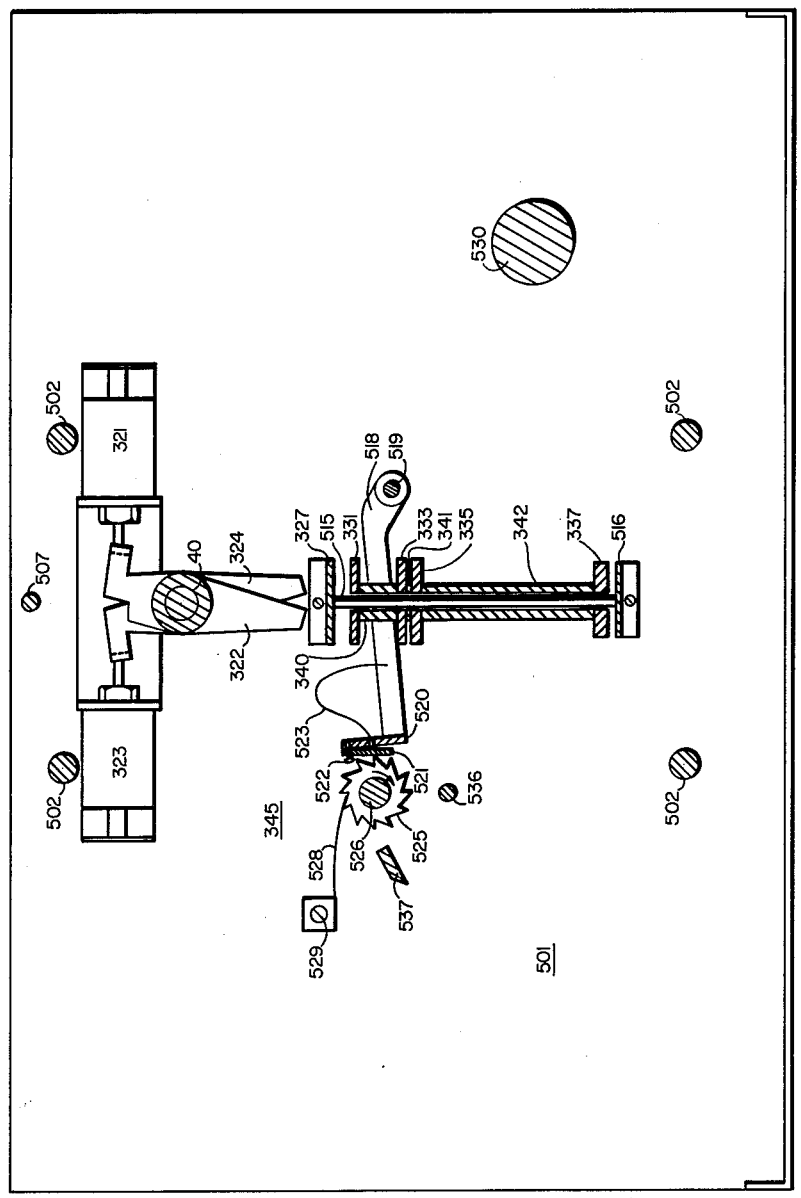
FIGURE 6 is a cross sectional view of the recording device taken along the line 6—6 of FIG. 5.

In FIG. 6 the physical arrangement of obstructing members 322 and 324 is shown. Both members are mounted side by side for rotation on shaft 40. Spring means not shown urges each member away from its obstructing position so that the upper portion of each member is in contact with its operating solenoid and will be moved by its operating solenoid to its obstructing position when the solenoid is energized.

The movable members of the punching mechanism comprising return plate 331, stripper plate 333, die plate 335, operating member 337 and the tubular separating members 340, 341 and 342 are slidably supported on a pair of rods 515, only one of which is shown in FIG. 6, connected at one end to fixed plate 327 and at their other end to a fixed support member 516. Plate 327 and member 516 each have one end attached to wall 501 and their other end to wall 503.

The paper drive mechanism 345 shown in block form in FIG. 3 is best shown in FIG. 6. A lever 518 shown in FIG. 6 is pivotally mounted at one end on a shaft 519. The lever passes between return plate 331 and stripper plate 333. The other end of the lever has an upright support member 520 mounted thereon. A tooth engaging member 521 is loosely mounted on a rivet 522 attached to the upper extreme of member 520 and urged away from member 520 by a hair spring 523. The movement of tooth engaging member 521 is restricted by a ratchet wheel 525 which is mounted for rotation on a fixed shaft 526 which extends between walls 501 and 503. Thus, when the stripper plate 333 is raised it bears against lever 518 and elevates it so that tooth engaging member 521 which is also elevated will engage a tooth on ratchet wheel 525. Member 521 is held in engagement with the tooth by spring 523. On the latter portion of the downward stroke of the punching mechanism the lower surface of return plate 331 urges lever 518 toward its starting position which causes wheel 525 to rotate a predetermined amount to free tooth engaging member 521. Once member 521 is free of wheel 525 lever 518 returns to the position shown in FIG. 6. Movement of wheel 525 is restricted on the upward stroke of the punching mechanism by a flat spring 528 which has one end attached to wall 501 by a screw 529 and a free end which engages one tooth of wheel 525 to prevent rotation in the counterclockwise direction only.

The paper tape, idler rolls and the tape drive roll are shown in FIG. 7. The roll of tape 350 is mounted on a shaft 530 which extends between walls 501 and 503 and the tape passes under a first idler roll 531 mounted on shaft 519. It then passes between the stripper plate 333 and the die plate 335. The tape then goes between a drive roll 533, mounted on shaft 526, and a pressure roll 535 mounted on a shaft 536 which extends between walls 501 and 503. A paper tear bar 537 is mounted between walls 501 and 503 and permits easy separation and removal of the punched tape which has accumulated in the storage compartment shown in FIG. 1.

The stationary parts of solenoid 352 are supported by a strut 539, shown in FIG. 5, which extends from wall 503. The armature 540 of solenoid 352 is attached to actuator bar 337 and when solenoid 352 is energized bar 337, die plate 335, stripper plate 333 and return plate 331 are urged upward. The tape 340 will be perforated by those punches which are obstructed while those punches which are not obstructed will be lifted by the tape.

While only one specific embodiment of the invention has been shown and described in detail, it is obvious that many substitutions may be made for different mechanisms used to perform different functions and therefore applicants wish it clearly understood that the invention is not limited to the specific embodiment described and shown for illustration purposes.

What is claimed is:

A multiple channel closed circuit television use recording system comprising;
  an attachment for receiving a plurality of different information bearing signals each superposed on a different carrier frequency, a corresponding number of different conversion signals, and a clock signal;
  said attachment including a plurality of converter means each of which when activated converts one of said information bearing carriers by mixing with its corresponding conversion signal to a single preselected frequency which is identical to the frequency of a single preselected standard television broadcast channel and in addition provides a signal for identifying the converted carrier;
  a plurality of displaceable selectors each of which activates one only of the above said converter means when displaced;
  a television receiver having a tuner preset to the said preselected standard television broadcast channel when used for receiving any one of the aforesaid closed circuit television information bearing signals;
  means for connecting the converted carrier signals from the attachment to the antenna input of the television receiver;
  means responsive to the said clock signal for providing a time record;
  and means responsive to the said carrier identifying signal for providing a record, contiguous with the said time record, for identifying the selected converted carrier signal.

References Cited in the file of this patent
UNITED STATES PATENTS

| | | |
|---|---|---|
| 487,433 | Stahlberg | Dec. 6, 1892 |
| 986,457 | Green et al. | Mar. 14, 1911 |
| 2,121,184 | Buckley | June 21, 1938 |
| 2,421,697 | Hobby | June 3, 1947 |
| 2,570,209 | Cotsworth | Oct. 9, 1951 |
| 2,705,105 | Paschen | Mar. 29, 1955 |
| 2,709,636 | Owens | May 31, 1955 |
| 2,854,506 | Pickles | Sept. 30, 1958 |

FOREIGN PATENTS

| | | |
|---|---|---|
| 781,084 | Great Britain | Aug. 14, 1947 |
| 773,195 | Great Britain | Apr. 24, 1957 |